US011574022B2

(12) United States Patent
Trim et al.

(10) Patent No.: US 11,574,022 B2
(45) Date of Patent: Feb. 7, 2023

(54) DERIVATION OF PROGRESSIVELY VARIANT DARK DATA UTILITY

(71) Applicant: International Business Machines Corporation, Armonk, NY (US)

(72) Inventors: Craig M. Trim, Ventura, CA (US); Aaron K. Baughman, Cary, NC (US); Michael Bender, Rye Brook, NY (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 17/209,364

(22) Filed: Mar. 23, 2021

(65) Prior Publication Data

US 2022/0309102 A1   Sep. 29, 2022

(51) Int. Cl.
*G06F 16/907* (2019.01)

(52) U.S. Cl.
CPC .................... *G06F 16/907* (2019.01)

(58) Field of Classification Search
CPC .................................................. G06F 16/907
See application file for complete search history.

(56) References Cited

U.S. PATENT DOCUMENTS

| 9,455,871 | B1 | 9/2016 | Chheda | |
| 9,875,086 | B1* | 1/2018 | Anderson | G06F 11/3006 |
| 10,430,250 | B2 | 10/2019 | Ishikawa | |
| 10,547,682 | B2 | 1/2020 | Suter | |
| 10,579,370 | B2 | 3/2020 | Gupta | |
| 10,620,947 | B2 | 4/2020 | Gavisiddappa Kodigenahalli | |
| 10,666,527 | B2 | 5/2020 | Roche | |
| 11,086,550 | B1* | 8/2021 | Palanichamy | G06F 16/256 |
| 11,157,267 | B1* | 10/2021 | Li | G06F 8/70 |
| 2007/0112574 | A1 | 5/2007 | Greene | |
| 2016/0269482 | A1 | 9/2016 | Jamjoom | |
| 2018/0248771 | A1* | 8/2018 | Côté et al. | H04L 41/5009 |
| 2019/0042988 | A1* | 2/2019 | Brown | G06N 5/022 |
| 2019/0158420 | A1 | 5/2019 | Soni | |
| 2020/0293933 | A1* | 9/2020 | Ghosh | H04L 67/34 |
| 2020/0379974 | A1* | 12/2020 | Stennett | G06F 16/2228 |

(Continued)

FOREIGN PATENT DOCUMENTS

| DE | 112017006994 T5 | 10/2019 | |
| WO | 2011126902 A2 | 10/2011 | |
| WO | WO-2019084215 A1 * | 5/2019 | G06F 16/244 |

OTHER PUBLICATIONS

Gartner, "Dark Data", Gartner, Accessed on Feb. 1, 2021, 2 Pages.

(Continued)

*Primary Examiner* — Robert W Beausoliel, Jr.
*Assistant Examiner* — Susan F Rayyan
(74) *Attorney, Agent, or Firm* — Stephanie L. Carusillo (57) ABSTRACT

In an approach for derivation of progressively variant dark data utility for legacy system candidate microservices, a processor analyzes a variability of data stored in a legacy system for a plurality of data metrics. A processor measures, for each data metric, a utility of the data using an intra-analysis and a meta-analysis. A processor correlates the plurality of data metrics to candidate microservices. A processor generates insights for the candidate microservices based on the utility of the data.

17 Claims, 4 Drawing Sheets

(56) References Cited

U.S. PATENT DOCUMENTS

| | | | |
|---|---|---|---|
| 2020/0410304 A1* | 12/2020 | Zhou | G06F 17/16 |
| 2021/0042767 A1* | 2/2021 | Guan | G06Q 30/0255 |
| 2021/0110328 A1* | 4/2021 | Hsiao | G06F 16/24568 |
| 2021/0149668 A1* | 5/2021 | Gupta | G06F 9/547 |
| 2021/0216444 A1* | 7/2021 | Gefen | G06F 11/3688 |
| 2022/0027361 A1* | 1/2022 | Yamato, II | G06F 16/2455 |
| 2022/0107785 A1* | 4/2022 | Vadayadiyil Raveendran | G06F 40/279 |
| 2022/0164186 A1* | 5/2022 | Pamidala | G06F 9/5072 |
| 2022/0188104 A1* | 6/2022 | Wan | G06F 8/75 |
| 2022/0225065 A1* | 7/2022 | Doken | H04L 41/5054 |
| 2022/0247769 A1* | 8/2022 | Erlingsson | H04L 41/0823 |
| 2022/0269582 A1* | 8/2022 | Spiro | G06F 11/3664 |

OTHER PUBLICATIONS

Johnson, Heather, "Digging up dark data: What puts IBM at the forefront of insight economy | #IBMinsight", SiliconANGLE Media Inc., Oct. 30, 2015, 2 Pages.

Otharson, Hans, "No More Middleware: Microservices Give COBOL New Life on the Mainframe", The New Stack, Nov. 25, 2019, 11 Pages.

* cited by examiner

DERIVATION OF PROGRESSIVELY VARIANT DARK DATA UTILITY

BACKGROUND OF THE INVENTION

The present invention relates generally to the field of data processing, and more particularly to derivation of progressively variant dark data utility for legacy system candidate microservices.

About 90% of data generated by most sensors never gets utilized and 60% of that data loses its true value within milliseconds. This type of data is known as dark data, where data is acquired by a computing system but not used in a timely manner to derive decision making insights from the data. Dark data has also been defined as the information assets organizations collect, process, and store during regular business activities but generally fail to use for other purposes (e.g., analytics, business relationships, and direct monetizing).

Legacy system modernization focuses on exposure of information stored on mainframes, where approximately 70% of the world's data still resides. Increasingly this data is exposed through microservices. These microservices offer a common interface to legacy system functionality and provide highly specific instructions to a legacy system to deliver definitive information to a requesting application. A typical legacy system comprises thousands of candidate microservices. That is information, services, and functionality that could potentially be exposed as a microservice. The cost of conversion, re-writing, or re-platforming data is prohibitively expensive; therefore, an organization must prioritize which candidate microservices should actually be developed.

SUMMARY

Aspects of an embodiment of the present invention disclose a method, computer program product, and computer system for derivation of progressively variant dark data utility for legacy system candidate microservices. A processor analyzes a variability of data stored in a legacy system for a plurality of data metrics. A processor measures, for each data metric, a utility of the data using an intra-analysis and a meta-analysis. A processor correlates the plurality of data metrics to candidate microservices. A processor generates insights for the candidate microservices based on the utility of the data.

In some aspects of an embodiment of the present invention, the plurality of data metrics includes transaction volume and data throughput.

In some aspects of an embodiment of the present invention, a processor analyzes the variability of the data stored in the legacy system for the plurality of data metrics by applying bidirectional recurrent metric analysis to establish cosine similarities between two microservices.

In some aspects of an embodiment of the present invention, the intra-analysis is the utility of the data within the legacy system and the meta-analysis is the utility of the data across an organization from all data sources.

In some aspects of an embodiment of the present invention, a processor correlates the plurality of data metrics to the candidate microservices by (1) analyzing a given candidate microservice to derive which data metrics the a given candidate microservice will expose; (2) for each data metric exposed by the candidate microservice, retrieving a cumulative data utility score of the candidate microservice; and (3) tallying the cumulative data utility score for each data metric exposed in the given candidate microservice to rate an overall useful lifespan of the data exposed by the candidate microservice.

In some aspects of an embodiment of the present invention, the cumulative data utility score includes an intra-analysis data utility score and a meta-analysis data utility score, and wherein the intra-analysis data utility score is a first expected useful lifespan of a given data metric as the given data metric is used within the legacy system and the meta-analysis data utility score is a second expected useful lifespan of a given data metric as the given data metric is observed or forecasted to be used in systems beyond the legacy system.

In some aspects of an embodiment of the present invention, a processor generates the insights for the candidate microservices based on the utility of the data by providing recommendations for which candidate microservices will capitalize on the data that would otherwise go dark through exposure as a microservice, wherein each recommendation is in a form of a scored weighting that includes a derived value of the data exposed by a given candidate microservice and a derived lifespan of the data exposed by the given candidate microservice.

DETAILED DESCRIPTION

Embodiments of the present invention recognize that legacy system modernization focuses on exposure of information stored on mainframes through microservices. These microservices offer a common interface to legacy system functionality and provide highly specific instructions to a legacy system to deliver definitive information to a requesting application. A typical legacy system comprises thousands of candidate microservices. That is information, services, and functionality that could potentially be exposed as a microservice. Embodiments of the present invention further recognize that the cost of conversion, re-writing, or re-platforming data is prohibitively expensive; therefore, an organization must prioritize which candidate microservices should actually be developed.

Embodiments of the present invention provide a system and method for deriving a utility of developing candidate legacy system microservices to understand the cost of progressively variant dark data. Using embodiments of the present invention, an organization can prioritize exposure of legacy systems' functionality as microservices through understanding the impact the microservices will contribute towards minimizing progressively variant dark data and latent data potential. Embodiments of the present invention prioritize legacy system candidate microservices based upon their utility to reducing progressively variant dark data, i.e., which candidate microservices could best prevent legacy system data from going dark. Embodiments of the present invention focus on progressively variant dark data, i.e., data that is stored on legacy systems that is non-constant, changing more and more over time.

Embodiments of the present invention utilize intra-analysis and meta-analysis to measure the utility of progressively variant data metrics in a legacy system to determine the susceptibility of the data becoming dark. Embodiments of the present invention correlate progressively variant data metrics to candidate microservices in a legacy system. Embodiments of the present invention generate insights scoring the exposure of progressively variant dark data to a given legacy system candidate microservice.

Implementation of embodiments of the invention may take a variety of forms, and exemplary implementation details are discussed subsequently with reference to the Figures.

Figure 1:
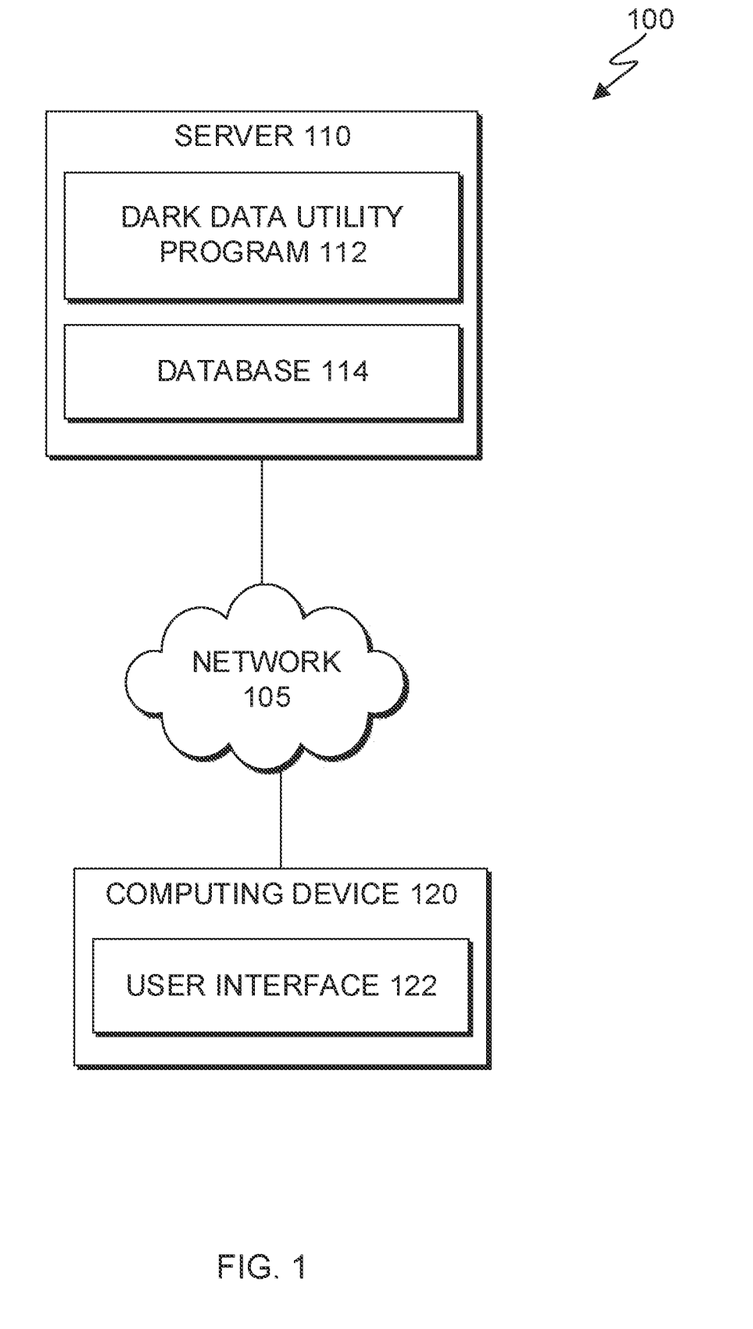
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110 and computing device 120, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between server 110, computing device 120, and other computing devices (not shown) within distributed data processing environment 100.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any programmable electronic device capable of communicating with computing device 120, and other computing devices (not shown) within distributed data processing environment 100 via network 105. In another embodiment, server 110 represents a computing system utilizing clustered computers and components (e.g., database server computers, application server computers, etc.) that act as a single pool of seamless resources when accessed within distributed data processing environment 100. Server 110 includes dark data utility program 112 and database 114. Server 110 may include internal and external hardware components, as depicted and described in further detail with respect to FIG. 4.

Dark data utility program 112 operates to utilize intra-analysis and meta-analysis to measure the utility of progressively variant data metrics in a legacy system to determine the susceptibility of the data becoming dark, correlate progressively variant data metrics to candidate microservices in the legacy system, and generate insights scoring the exposure of progressively variant dark data to a given legacy system candidate microservice. In the depicted embodiment, dark data utility program 112 is a standalone program. In another embodiment, dark data utility program 112 may be integrated into, or consumed by, another software product, such as a microservices package. Dark data utility program 112 is depicted and described in further detail with respect to FIG. 2 and FIG. 3.

Database 114 operates as a repository for data received, used, and/or output by dark data utility program 112. Data received, used, and/or generated may include, but is not limited to, analysis data for analysis of variability of data stored in a legacy system; and any other data received, used, and/or output by dark data utility program 112. Database 114 can be implemented with any type of storage device capable of storing data and configuration files that can be accessed and utilized by server 110, such as a hard disk drive, a database server, or a flash memory. In an embodiment, database 114 is accessed by dark data utility program 112 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that dark data utility program 112 has access to database 114.

The present invention may contain various accessible data sources, such as database 114, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Dark data utility program 112 enables the authorized and secure processing of personal data.

Dark data utility program 112 provides informed consent, with notice of the collection of personal and/or confidential company data, allowing the user to opt in or opt out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. Dark data utility program 112 provides information regarding personal and/or confidential company data and the nature (e.g., type, scope, purpose, duration, etc.) of the processing. Dark data utility program 112 provides the user with copies of stored personal and/or confidential company data. Dark data utility program 112 allows the correction or completion of incorrect or incomplete personal and/or confidential company data. Dark data utility program 112 allows for the immediate deletion of personal and/or confidential company data.

Computing device 120 operates as a computing device associated with a user on which the user can interact with dark data utility program 112 through an application user interface. In the depicted embodiment, computing device 120 includes an instance of user interface 122. In an embodiment, computing device 120 can be a laptop computer, a tablet computer, a smart phone, a smart watch, an e-reader, smart glasses, wearable computer, or any programmable electronic device capable of communicating with various components and devices within distributed data processing environment 100, via network 105. In general, computing device 120 represents one or more programmable electronic devices or combination of programmable electronic devices capable of executing machine readable program instructions and communicating with other computing devices (not shown) within distributed data processing environment 100 via a network, such as network 105. Computing device 120 may include internal and external hardware components, as depicted and described in further detail with respect to FIG. 4.

User interface 122 provides an interface between dark data utility program 112 on server 110 and a user of computing device 120. In one embodiment, user interface 122 is a mobile application software. Mobile application software, or an "app," is a computer program designed to run on smart phones, tablet computers, and other mobile computing devices. In one embodiment, user interface 122 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 122 enables a user of user computing device 130 to view and/or manage output of dark data utility program 112.

Figure 2:
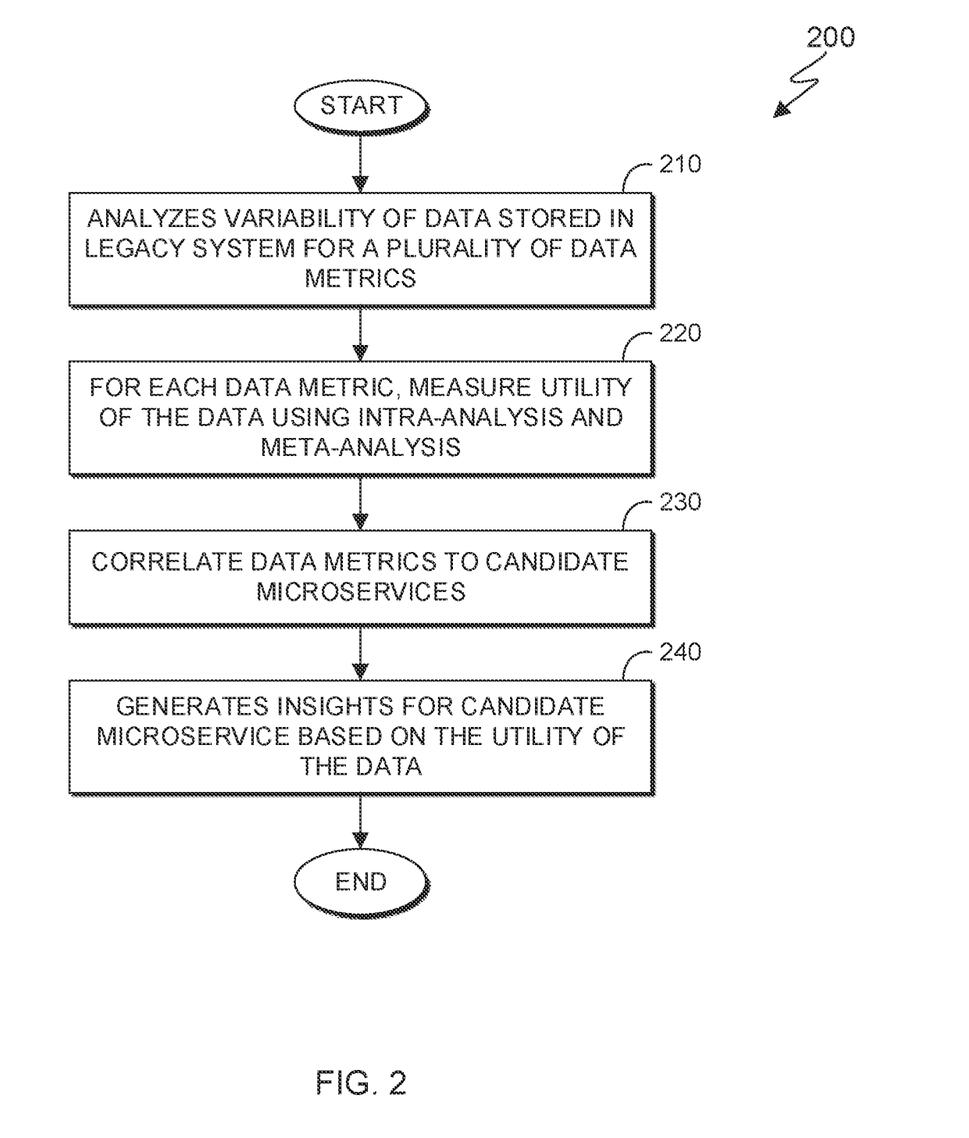
FIG. 2 is a flowchart depicting operational steps of a dark data utility program, for derivation of progressively variant dark data utility for legacy system candidate microservices, in accordance with an embodiment of the present invention.

FIG. 2 is a flowchart 200 depicting operational steps of dark data utility program 112, for derivation of progressively variant dark data utility for legacy system candidate microservices, in accordance with an embodiment of the present invention. It should be appreciated that the process depicted in FIG. 2 illustrates one possible iteration of dark data utility program 112, which can be repeated for different legacy systems.

In step 210, dark data utility program 112 analyzes variability of data stored in a legacy system for a plurality of data metrics. In an embodiment, dark data utility program 112 analyzes variability of progressively variant dark data stored in a legacy system for a plurality of data metrics, such as transaction volume and data throughput. In an embodiment, dark data utility program 112 receives the data stored in the legacy system from database 114 and/or computing device 120. In an embodiment, dark data utility program 112 analyzes the variability of the data by application of bidirectional recurrent metric analysis to establish cosine similarities, i.e., a degree of similarity, between two microservices. In an embodiment, dark data utility program 112 completes this analysis for each possible pair of microservices of the legacy system. In an embodiment, dark data utility program 112 stores a summary and the degree of similarity for the two microservices computed for a particular timestamp. Over time, dark data utility program 112 can measure the variance between summaries at different timestamps based on the cosine similarity as ordinal rankings of how correlated a microservice is to another. For example, if a microservice is correlated to a service of rank 1 then changes to rank 5 in the next timestamp that would indicate the data is highly variable. Step 210 is described in further detail with respect to FIG. 3.

In step 220, dark data utility program 112, for each data metric, measures a utility of the data using intra-analysis and meta-analysis. In an embodiment, dark data utility program 112 measures, for each data metric, the utility of the data within the legacy system (intra-analysis) and across an organization in general from all data sources (meta-analysis) to derive a value of timely processing of the data. For each data metric, dark data utility program 112 determines a cosine similarity measure acceleration and velocity between a pair of microservices (inter) and between a microservice (intra); gathers a data density, in which the volume measure used to determine the data density equals clusters times input/output (IO) rate to establish the similarity or difference between the variability of a given metric; and inputs these determined and gathered values into a recurrent neural network (RNN) to get a data time to live value, which refers to how long to retain the data. In an embodiment, dark data utility program 112 calculates a cumulative data utility score for each microservice instantiation, which include an intra-analysis data utility score and a meta-analysis data utility score.

In step 230, dark data utility program 112 correlates the data metrics to candidate microservices. In an embodiment, dark data utility program 112 correlates which progressively variant data metrics have an association to which candidate microservices. Dark data utility program 112 determines these correlations by doing the following for each candidate microservice: (1) analyzing a given candidate microservice to derive the data metric that the microservice will expose; (2) for each data metric exposed by the candidate microservice, retrieving the cumulative data utility scores, which include an intra-analysis data utility score and a meta-analysis data utility score; and (3) tallying the cumulative data utility scores for all data metrics exposed in the given candidate microservice to rate the overall useful lifespan of data exposed by the candidate microservice. The intra-analysis data utility score is an expected useful lifespan of a given data metric as it is used within the legacy system. The meta-analysis data utility score is an expected useful lifespan of a given data metric as it is observed or forecasted to be used in systems beyond the legacy system.

In step 240, dark data utility program 112 generates insights for candidate microservices based on the utility of the data. In an embodiment, dark data utility program 112 generates insights for each candidate microservice based on the cumulative data utility score. In an embodiment, dark data utility program 112 provides recommendations for which candidate microservices will provide the greatest ability to capitalize on data that would otherwise go dark through exposure as a microservice. In an embodiment, dark data utility program 112 provides a recommendation in the form of a scored weighting that includes (1) a derived value of the data exposed by a given candidate microservice and (2) a derived lifespan of data exposed by the given candidate microservice. An owner of the legacy system can use the resultant insights and recommendations to perform a cost-benefit analysis of developing each candidate microservice. In an embodiment, dark data utility program 112 outputs insights generated and/or recommendations to a user through a user interface of computing device, e.g., user interface 122 of computing device 120.

Figure 3:
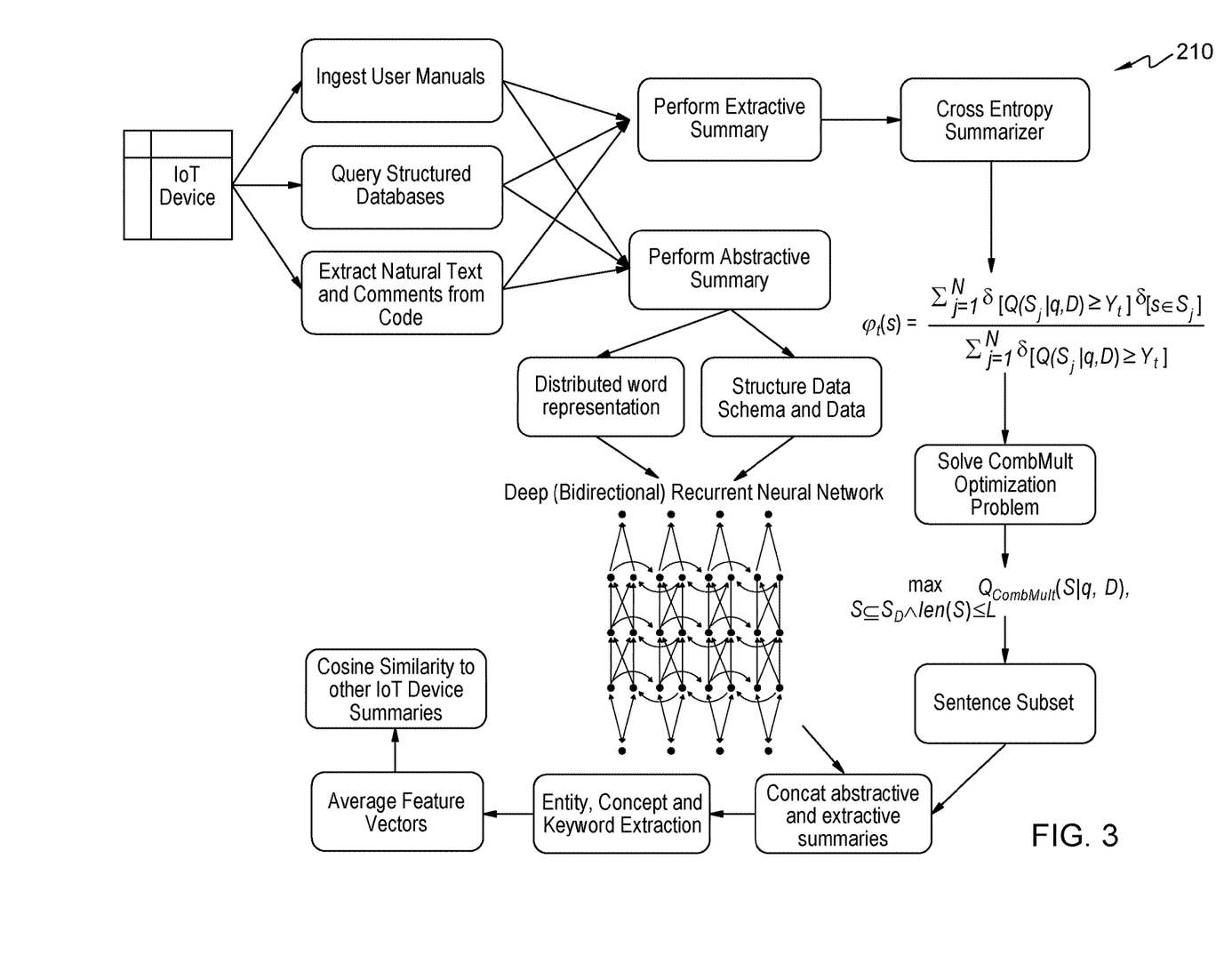
FIG. 3 is a flowchart depicting operational steps of a first step of the dark data utility program, for analyzing the variability of data stored in a legacy system for a plurality of data metrics, in accordance with an embodiment of the present invention.

FIG. 3 is a flowchart depicting operational steps of step 210 of dark data utility program 112, for analyzing the variability of data stored in a legacy system for a plurality of data metrics, in accordance with an embodiment of the present invention. Essentially, for a microservice, FIG. 3 ingests user manuals, structured data in data stores, and unstructured data in natural language. Through a series of extractive and abstractive summaries, combined with methods for cross entropy summarization, a concatenated summary is formed, both in abstractive and extractive form. The abstractive summary is performed using a deep bidirectional recurrent neural network that ingests distributed word representation and structured data schema and data. The extractive summary is performed using cross entropy summarization (using the formula shown in FIG. 3) and by solving the Combinational Multiplier (CombMult) Optimization problem (also shown in FIG. 3). The summaries are analyzed for entity, concept, and keyword extraction to derive the cosine similarity to other data metrics.

Figure 4:
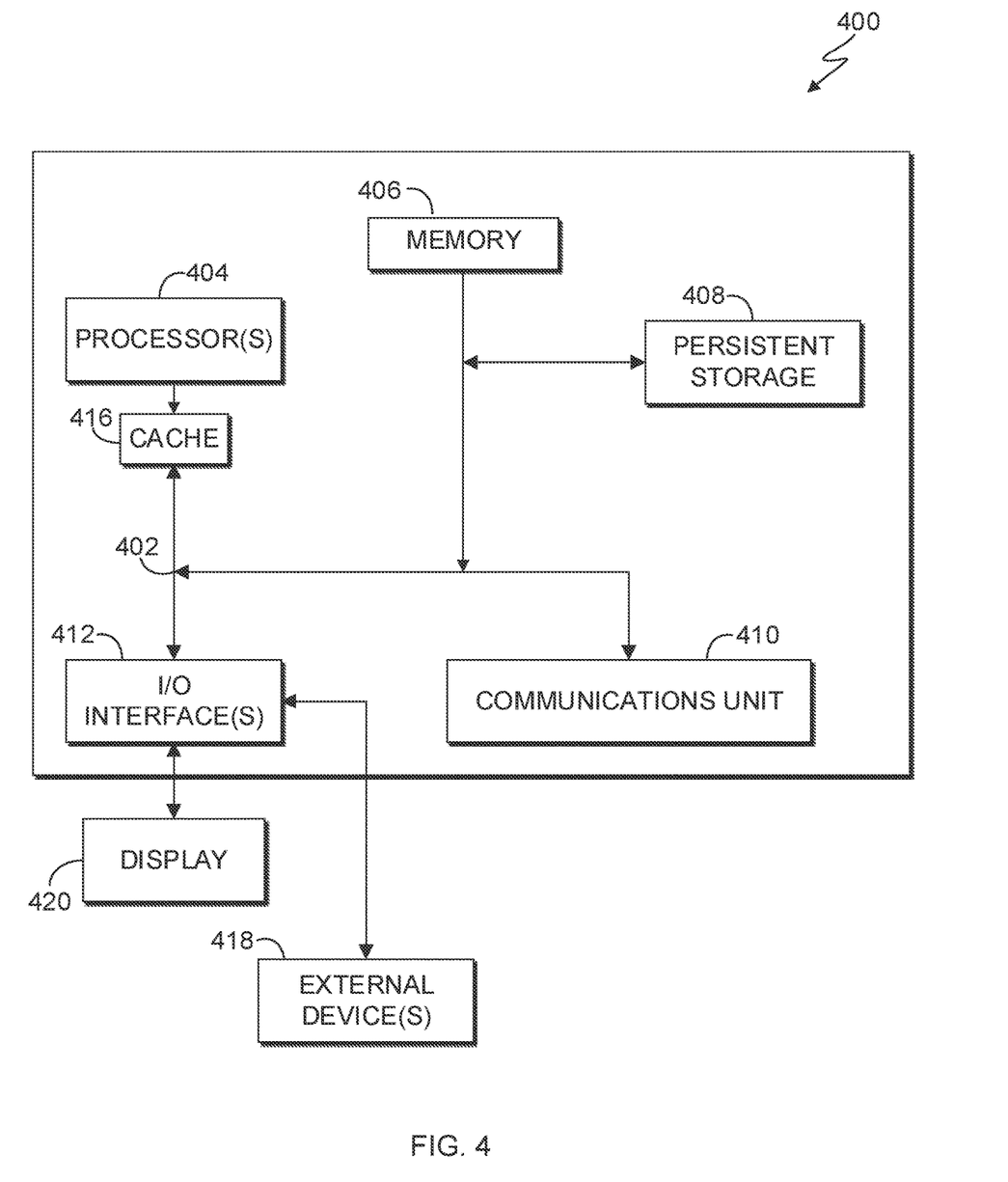
FIG. 4 depicts a block diagram of components of a computing device of the distributed data processing environment of FIG. 1, in accordance with an embodiment of the present invention.

FIG. 4 depicts a block diagram of components of computing device 400, suitable for server 110 and/or computing device 120 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Programs may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Programs may be downloaded to persistent storage 408 through communications unit 410.

I/O interface(s) 412 allows for input and output of data with other devices that may be connected to server 110 and/or computing device 120. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
analyzing, by one or more processors, variability of data stored in a legacy system for a plurality of data metrics;
measuring, by the one or more processors, for each data metric, a utility of the data using an intra-analysis and a meta-analysis;
correlating, by the one or more processors, the plurality of data metrics to candidate microservices; and
generating, by the one or more processors, insights for the candidate microservices based on the utility of the data by providing recommendations for which candidate microservices will capitalize on the data that would otherwise go dark through exposure as a microservice, wherein each recommendation is in a form of a scored weighting that includes a derived value of the data exposed by a given candidate microservice and a derived lifespan of the data exposed by the given candidate microservice.

2. The computer-implemented method of claim 1, wherein the plurality of data metrics includes transaction volume and data throughput.

3. The computer-implemented method of claim 1, wherein analyzing the variability of the data stored in the legacy system for the plurality of data metrics comprises:
applying, by the one or more processors, bidirectional recurrent metric analysis to establish cosine similarities between two microservices.

4. The computer-implemented method of claim 1, wherein the intra-analysis is the utility of the data within the legacy system and the meta-analysis is the utility of the data across an organization from all data sources.

5. The computer-implemented method of claim 1, wherein correlating the plurality of data metrics to the candidate microservices comprises:

analyzing, by the one or more processors, a given candidate microservice to derive which data metrics the a given candidate microservice will expose;

for each data metric exposed by the candidate microservice, retrieving, by the one or more processors, a cumulative data utility score of the candidate microservice; and tallying, by the one or more processors, the cumulative data utility score for each data metric exposed in the given candidate microservice to rate an overall useful lifespan of the data exposed by the candidate microservice.

6. The computer-implemented method of claim 5, wherein the cumulative data utility score includes an intra-analysis data utility score and a meta-analysis data utility score, and wherein the intra-analysis data utility score is a first expected useful lifespan of a given data metric as the given data metric is used within the legacy system and the meta-analysis data utility score is a second expected useful lifespan of a given data metric as the given data metric is observed or forecasted to be used in systems beyond the legacy system.

7. A computer program product comprising:
one or more computer readable storage media and program instructions collectively stored on the one or more computer readable storage media, the stored program instructions comprising:
program instructions to analyze variability of data stored in a legacy system for a plurality of data metrics;
program instructions to measure, for each data metric, a utility of the data using an intra- analysis and a meta-analysis;
program instructions to correlate the plurality of data metrics to candidate microservices; and
program instructions to generate insights for the candidate microservices based on the utility of the data by providing recommendations for which candidate micro services will capitalize on the data that would otherwise go dark through exposure as a microservice, wherein each recommendation is in a form of a scored weighting that includes a derived value of the data exposed by a given candidate microservice and a derived lifespan of the data exposed by the given candidate microservice.

8. The computer program product of claim 7, wherein the plurality of data metrics includes transaction volume and data throughput.

9. The computer program product of claim 7, wherein the program instructions to analyze the variability of the data stored in the legacy system for the plurality of data metrics comprise:
program instructions to apply bidirectional recurrent metric analysis to establish cosine similarities between two microservices.

10. The computer program product of claim 7, wherein the intra-analysis is the utility of the data within the legacy system and the meta-analysis is the utility of the data across an organization from all data sources.

11. The computer program product of claim 7, wherein the program instructions to correlate the plurality of data metrics to the candidate microservices comprise:
program instructions to analyze a given candidate microservice to derive which data metrics the a given candidate microservice will expose;
for each data metric exposed by the candidate microservice, program instructions to retrieve a cumulative data utility score of the candidate microservice; and
program instructions to tally the cumulative data utility score for each data metric exposed in the given candidate microservice to rate an overall useful lifespan of the data exposed by the candidate microservice.

12. The computer program product of claim 11, wherein the cumulative data utility score includes an intra-analysis data utility score and a meta-analysis data utility score, and wherein the intra-analysis data utility score is a first expected useful lifespan of a given data metric as the given data metric is used within the legacy system and the meta-analysis data utility score is a second expected useful lifespan of a given data metric as the given data metric is observed or forecasted to be used in systems beyond the legacy system.

13. A computer system comprising:
one or more computer processors;
one or more computer readable storage media;
program instructions collectively stored on the one or more computer readable storage media for execution by at least one of the one or more computer processors, the stored program instructions comprising:
program instructions to analyze variability of data stored in a legacy system for a plurality of data metrics;
program instructions to measure, for each data metric, a utility of the data using an intra-analysis and a meta-analysis;
program instructions to correlate the plurality of data metrics to candidate microservices; and
program instructions to generate insights for the candidate microservices based on the utility of the data by providing recommendations for which candidate micro services will capitalize on the data that would otherwise go dark through exposure as a microservice, wherein each recommendation is in a form of a scored weighting that includes a derived value of the data exposed by a given candidate microservice and a derived lifespan of the data exposed by the given candidate microservice.

14. The computer system of claim 13, wherein the plurality of data metrics includes transaction volume and data throughput.

15. The computer system of claim 13, wherein the program instructions to analyze the variability of the data stored in the legacy system for the plurality of data metrics comprise:
program instructions to apply bidirectional recurrent metric analysis to establish cosine similarities between two microservices.

16. The computer system of claim 13, wherein the program instructions to correlate the plurality of data metrics to the candidate microservices comprise:
program instructions to analyze a given candidate microservice to derive which data metrics the a given candidate microservice will expose;
for each data metric exposed by the candidate microservice, program instructions to retrieve a cumulative data utility score of the candidate microservice; and
program instructions to tally the cumulative data utility score for each data metric exposed in the given candidate microservice to rate an overall useful lifespan of the data exposed by the candidate microservice.

17. The computer system of claim 16, wherein the cumulative data utility score includes an intra-analysis data utility score and a meta-analysis data utility score, and wherein the intra-analysis data utility score is a first expected useful lifespan of a given data metric as the given data metric is used within the legacy system and the meta-analysis data utility score is a second expected useful lifespan of a given data metric as the given data metric is observed or forecasted to be used in systems beyond the legacy system.

* * * * *